F. HEAVENER.
Wind-Engine.

No. 208,816. Patented Oct. 8, 1878.

F. HEAVENER.
Wind-Engine.

No. 208,816. Patented Oct. 8, 1878.

WITNESSES:

INVENTOR:
F. Heavener
BY
ATTORNEYS.

UNITED STATES PATENT OFFICE.

FLOYD HEAVENER, OF LARAMIE CITY, WYOMING TERRITORY.

IMPROVEMENT IN WIND-ENGINES.

Specification forming part of Letters Patent No. 208,816, dated October 8, 1878; application filed August 19, 1878.

*To all whom it may concern:*

Be it known that I, FLOYD HEAVENER, of Laramie City, in the county of Albany, Wyoming Territory, have invented a new and Improved Wind-Wheel; and I do hereby declare that the following is a full, clear, and exact description of the same, reference being had to the accompanying drawing, forming part of this specification, in which—

Figure 1:
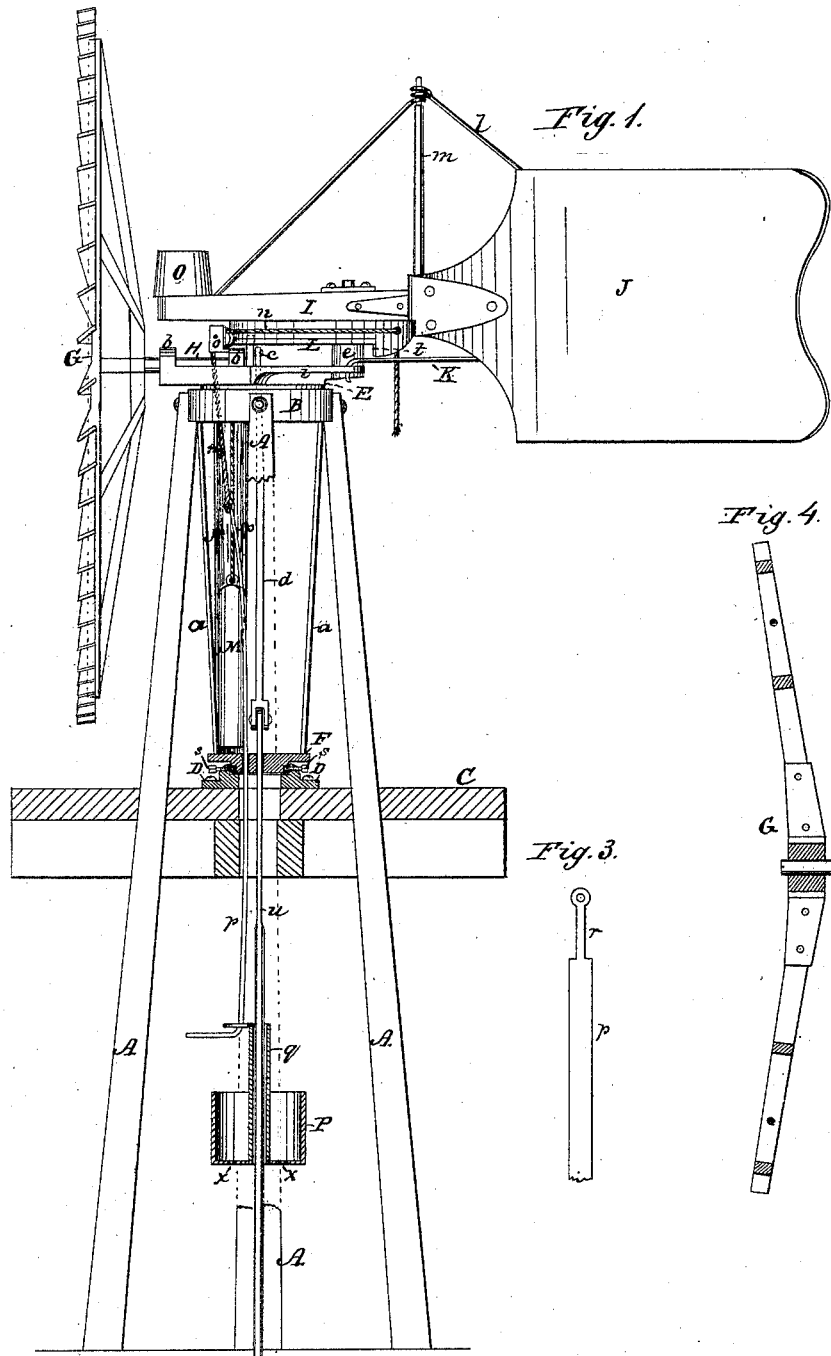
Figure 2:
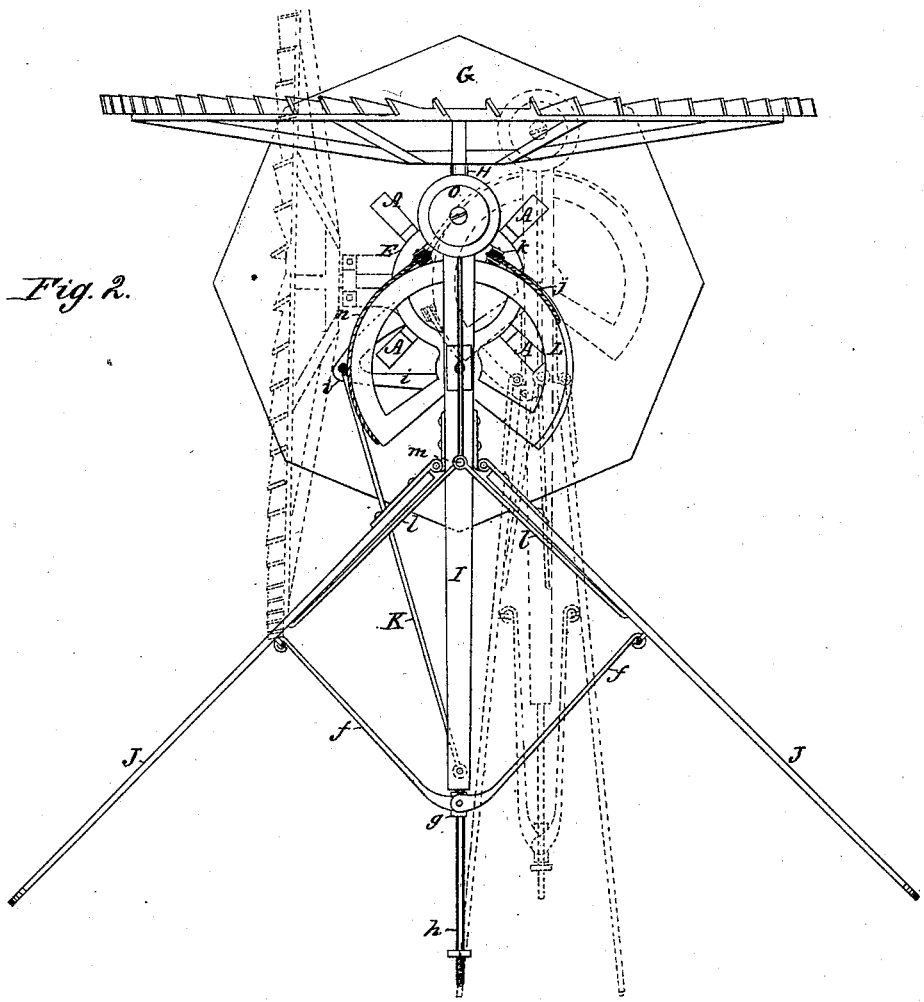

Figure 1 is a side elevation, partly in section. Fig. 2 is a plan view; Fig. 3, a detail of the rod $p$; Fig. 4, a detail of the wheel, showing its dished character.

My invention relates to an improvement in wind-wheels, designed to render the same self-governing by causing the area of resistance which the wheel presents to the wind to be automatically varied in inverse proportion to the force of the wind, to render the action of the wheel uniform.

The chief feature of the invention consists in hinging to a horizontal swinging beam two blades or vanes, arranged upon opposite sides, so as to present equal resistances, which blades are coupled together by toggle-arms, so that as the force of the wind increases the blades are forced together and the toggle-joint is thrown back, and is made, through a connecting-rod, to throw the wheel around edgewise to the wind, the said swinging beam having an independent pivot upon the swiveling-wheel frame to permit this action, as hereinafter fully described.

In the drawing, A represents four upright converging posts, which constitute the frame of the wheel. The upper ends of these posts are fastened by bolts to a circular band or collar, B. About midway the upright posts is constructed a platform, C, supported upon cross-bars, and provided upon its upper surface with a step-plate, D, which sustains the weight of the horizontally-swiveling wheel-frame. Said wheel-frame is constructed with a lower bearing-plate, F, resting upon the step-plate D, which bearing-plate F is connected by diverging rods $a$ with an upper circular frame, E, that swivels in the collar B of the main frame.

G is the wheel, which is rigidly attached to its short shaft H. Said wheel is made with radial arms, connected by cross-bars, and has a circular series of slats arranged inclinedly to the wind, which slats are secured to the cross-bar of the wheel by being let edgewise into slots, and then fastened therein by suitable means.

In constructing the wheel, the radial arms and slats are arranged at a little more than a right angle to the wheel-shaft, so as to give the wheel a dish, which makes a stronger wheel and gives better results.

The short shaft H, carrying the wheel, is arranged in bearings $b\ b$ in the upper portion of the circular frame E, and has upon its end, near the center of the frame, a disk and wrist-pin, $c$, which latter is connected to the pitman $d$, which in turn is attached to the vertically-reciprocating rod $u$, which may be either the piston-rod of a pump or other piece of connecting mechanism.

Upon an elevated bearing, $e$, on the rear portion of the circular frame E, is pivoted the beam I, arranged to swing horizontally. To this beam are hinged blades or tails J J, one upon each side, arranged with respect to each other, so as to present equal resistances to the wind. These blades or tails ordinarily serve to hold the front of the wheel to the wind. To the rear sides of these blades, about the middle, are loosely-attached arms $ff$, which are connected at $g$ to a collar, to form a toggle-joint, which collar slides along the guide-rod $h$, attached to the rear extremity of the swinging beam, in alignment therewith, so that as the force of the wind increases the blades are forced toward each other, closer to the swinging beam, and the toggle-joint is made to move to the rear.

In making the wheel automatic in regulating its speed, a connecting-rod, K, is attached at its rear end to the toggle-joint, while its front end is attached to an offset, $i$, from the circular frame E, carrying the wheel.

Now, the swinging beam having an independent pivot upon the frame E, it will be seen that the balanced tails will tend to hold it always straight to the wind; but as the force of the wind increases the two tails are forced together, the toggle-joint is made to move to the rear, the connecting-rod K is drawn back, and the frame E is turned partially around, so that the wheel is turned edgewise to the wind, to present an area of resistance which is proportionately less as the force of the wind is greater.

To restore the wheel to its position as the wind lulls, a segmental pulley, L, with a lower flange, is fixed to the swinging beam concentrically with its pivot, and a chain or rope, $j$, is attached to its periphery, and, after passing over a friction-pulley, $k$, on the circular frame E, is connected with a weight, M, moving vertically in a case, N. This weight, it will be seen, tends to throw the swinging beam and the shaft of the wheel into alignment again, and restores the front of the wheel to the wind.

To balance the weight of the tails, a weight, O, is placed upon the beam I, upon the opposite side of its pivot and near the wheel.

To relieve the hinges of the tails of too great strain, also, guy-rods $l$ are connected with the upper edge of the tails, and are provided with eyes or perforations, which swivel about the end of a braced standard, $m$, mounted upon the beam I.

When the wind-wheel is to be applied for pumping water, which is one of its most common applications, it is desirable that the wheel should no longer operate after a sufficient quantity of water has been drawn.

To render the wheel automatic in this respect, I attach to the segmental pulley L a chain, $n$, arranged upon the opposite side from the chain $j$, which chain $n$ I pass over a friction-pulley, $o$, on the frame E, and attach to a flat rod, $p$, which extends through a corresponding slot in the lower bearing-plate, F, and is attached to a bucket, P. This bucket is made with a hole through the center, to permit the piston-rod of the pump to pass through; and to prevent the water from running out at this hole, a tube, $q$, is fixed about the same, which tube rises above the level of the bucket.

Now, it will be seen that after a sufficient amount of water has been pumped up into a tank the overflow into the bucket causes it to be filled, and its weight causes the rod $p$ to be drawn down with the chain $n$, which latter throws the wheel around edgewise to the wind and stops its action. As soon as the water in the bucket becomes low from leakage through the holes $x$ in the bottom of the same, the weight M upon the other side again restores the front of the wheel to the wind.

To stop the action of the wheel by hand or at will, the bucket is pulled down by hand until a narrow portion, $r$, of the flat rod $p$ passes through the slot in the lower bearing-plate, F, at which time the flat rod is turned a quarter of a revolution, so that its shoulders rest beneath the slot in the bearing-plates, and hold the wheel with its edge to the wind.

To prevent the wheel-frame from rising, its lower bearing-plate, F, is held to its step by a set-screw, $s$, which enters a groove around the circular part of the lower bearing, and forms a swiveling connection between the wheel-frame and its step.

To prevent the wheel from being thrown around too far when turned edgewise to the wind, a stop, $t$, on the segmental pulley is arranged to strike the wheel-frame E and limit the movement.

Having thus described my invention, what I claim as new is—

1. The combination, with a swiveling frame carrying a wheel, of a horizontal beam pivoted to said frame, a pair of tails hinged upon opposite sides of said beam, and a set of toggle-arms fastened to the hinged tails at one end and connected through a rod with the wheel-frame, for the purpose of throwing the wheel out of wind, substantially as described.

2. The swinging beam I, having an independent pivot upon the wheel-frame, and a segmental pulley, L, rigidly attached to the same, in combination with the horizontally-swiveling wheel-frame having friction-pulley $k$, the cord or chain $j$, and the weight M, substantially as shown and described.

3. The combination, with the posts A, having a collar, B, at the upper end, and a platform, C, provided with a step-plate, D, of the swiveling wheel-frame, consisting of the lower bearing-plate, F, the rods $a$, and the upper circular frame, E, provided with bearings and carrying the wheel-shaft, substantially as and for the purpose described.

4. The bucket P, having a central tube encompassing the piston-rod, combined with said piston-rod and connected with devices for throwing the wheel out of the wind, substantially as shown and described.

5. The weight O, combined with the beam I, and arranged upon the beam on the opposite side of the pivot from the tails to balance the same, as shown and described.

6. The hinged tails J, combined with the swinging beam I, the standards $m$, and the guy-rods $l$, as and for the purpose described.

7. The flat rod $p$, attached to the shifting devices, and having a smaller or notched portion, $r$, in combination with the lower bearing-plate, F, having a slot corresponding to said rod, as and for the purpose described.

FLOYD HEAVENER.

Witnesses:
WM. A. MILLS, Jr.,
WM. H. FROST.